US009971386B2

(12) United States Patent
Trantow (10) Patent No.: US 9,971,386 B2
(45) Date of Patent: May 15, 2018

(54) MOBILE VIRTUAL DESKTOP

(75) Inventor: Wayne Douglas Trantow, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 12/423,792

(22) Filed: Apr. 14, 2009

(65) Prior Publication Data

US 2010/0309113 A1    Dec. 9, 2010

Related U.S. Application Data

(63) Continuation of application No. 10/160,558, filed on May 30, 2002, now Pat. No. 7,519,918.

(51) Int. Cl.
| | | |
|---|---|---|
| *G06F 3/048* | (2013.01) | |
| *G06F 1/16* | (2006.01) | |
| *G06F 9/44* | (2018.01) | |

(52) U.S. Cl.
CPC ............ *G06F 1/1694* (2013.01); *G06F 1/163* (2013.01); *G06F 1/1626* (2013.01); *G06F 1/1637* (2013.01); *G06F 9/4443* (2013.01); *G06F 2200/1637* (2013.01); *G09G 2340/145* (2013.01)

(58) Field of Classification Search
CPC ...... G06F 1/1694; G06F 1/1626; G06F 1/163; G06F 9/4443
USPC ....... 715/741, 744, 745, 746, 778, 789, 811, 715/864, 850, 863
See application file for complete search history.

(56) References Cited

U.S. PATENT DOCUMENTS

| | | | |
|---|---|---|---|
| 5,810,736 A * | 9/1998 | Pail ............................... 600/500 |
| 5,848,373 A * | 12/1998 | DeLorme ............... G01C 21/20 340/990 |
| 6,084,594 A | 7/2000 | Goto | |
| 6,201,554 B1 * | 3/2001 | Lands ........................... 345/169 |
| 6,240,421 B1 | 5/2001 | Stolarz | |
| 6,375,572 B1 * | 4/2002 | Masuyama et al. ............ 463/43 |
| 6,466,198 B1 * | 10/2002 | Feinstein ...................... 345/158 |
| 6,529,218 B2 | 3/2003 | Ogawa et al. | |
| 6,577,296 B2 * | 6/2003 | Flack ............................ 345/158 |
| 6,670,951 B2 * | 12/2003 | Clough et al. ................ 345/173 |
| 6,674,995 B1 | 1/2004 | Meyers et al. | |
| 7,065,785 B1 | 6/2006 | Shaffer et al. | |
| 7,173,604 B2 * | 2/2007 | Marvit et al. ................. 345/156 |
| 8,294,766 B2 * | 10/2012 | Tsai et al. ..................... 348/148 |
| 2002/0015024 A1 * | 2/2002 | Westerman et al. .......... 345/173 |
| 2002/0109680 A1 | 8/2002 | Orbanes et al. | |
| 2002/0143489 A1 * | 10/2002 | Orchard ................. G01P 13/00 702/141 |
| 2002/0164997 A1 | 11/2002 | Perry | |
| 2003/0038779 A1 * | 2/2003 | Baron ............... H04N 5/23293 345/157 |
| 2003/0133629 A1 | 7/2003 | Sayers | |
| 2004/0131043 A1 | 7/2004 | Keller | |
| 2004/0169674 A1 * | 9/2004 | Linjama ....................... 345/702 |

(Continued)

*Primary Examiner* — William Bashore
*Assistant Examiner* — Gregory A Distefano (57) ABSTRACT

A device includes a display screen a processor to render a display of a portion of a logical image on the screen. The logical image is larger than that which can be displayed on the display screen of the device. As the device is maneuvered through space, different portions of the logical image are displayed, and the user may interact with these portions as desired.

26 Claims, 5 Drawing Sheets

(56) References Cited

U.S. PATENT DOCUMENTS

2005/0193269 A1* 9/2005 Haswell et al. ............... 714/38
2008/0089587 A1* 4/2008 Kim ....................... G06F 3/017
                                                      382/190
2011/0010241 A1* 1/2011 Mays ....................... 705/14.49

* cited by examiner

MOBILE VIRTUAL DESKTOP

This patent application is a continuation of U.S. patent application Ser. No. 10/160,558, filed May 30, 2002, now U.S. Pat. No. 7,519,918.

BACKGROUND

1. Field

This disclosure relates to mobile devices, more particularly to managing information on mobile devices.

2. Background

Mobile devices include such things as personal digital assistants (PDAs) like the Palm® devices, cell phones, and palmtop PCs. However, several of these devices have very small screens and cannot render representations of all of the information or applications available on the device. The user interfaces with the information or the applications via a series of inputs, such as mouse scrolls, push buttons, menu selections or a combination of these. This can be repetitious and time consuming.

In some instances, the graphical user interface (GUI) on most mobile devices has inherited design rules and approaches from conventional desktop personal computers. On most desktop PCs, however, there is enough room to see the entire desktop on the screen. Mobile devices do not have that luxury.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
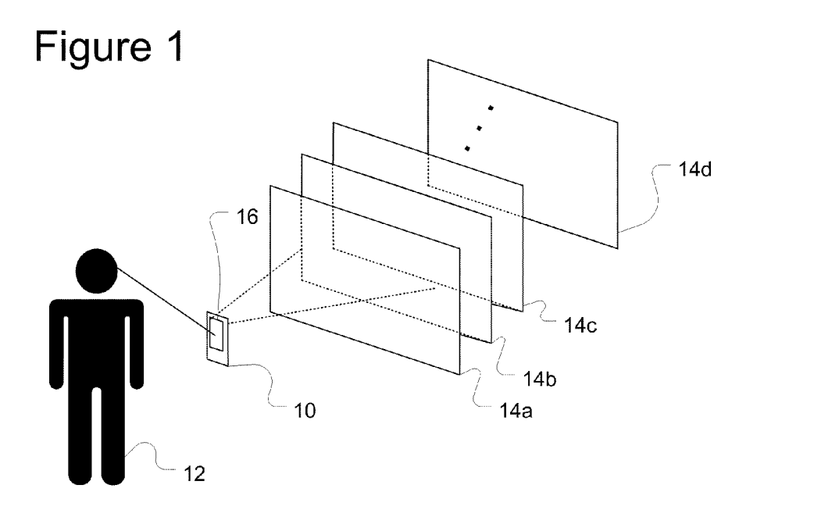
FIG. 1 shows an embodiment of a mobile virtual desktop system.

FIG. 1 shows an embodiment of a mobile virtual desktop system. The mobile virtual desktop (MVD) represents information upon a graphical 'desktop' just as a conventional personal computer graphical user interface (GUI) does. The MVD extends this model to bring a richer operating environment to mobile, or handheld, devices. In a conventional PC system, the logical desktop is synonymous with the physical two-dimensional display screen. Desktop objects, such as application icons, images and text are accessed and manipulated by a physical input device such as a keyboard, a mouse or a stylus pad or touch screen. Generally, in this type of environment all of the desired information objects in the logical desktop are rendered in the physical display. An information object is an object that is selectable from the desktop, where the desktop is the interface provided to the user for display of these objects. Navigation occurs via a discrete input device such as those mentioned above.

GUIs on conventional handheld devices, such as "pocket" PCs, personal digital assistants (PDAs) such as the Palm® series of devices, and cell phones, have inherited design restrictions from the conventional desktop PC. Typically, every logical page of data fits into the physical display and a cursor icon glides over the desktop to select information objects. The whole user desktop is seen on the screen, by changing the screen shots like a deck of cards. Text is typically formatted to fit the physical dimensions of the display screen.

It is possible to view the handheld, or mobile, device as a new device rather than a reduced-size PC. Mobile devices are light and easy to grasp and move in space. Secondly, the typically small size of mobile devices do not allow more conventional input devices to scale to human size, such as keyboards or numerical keypads as in cell phones. This makes them far less useful than on a PC. Finally, many of the devices overcome this lack of keyboards by using a stylus and touch pad, but that requires two hands, which can be awkward.

In the mobile virtual desktop system, as shown in FIG. 1, the handheld device becomes a 'lens' into a virtual desktop that is larger than that displayed on the device. The user 12 holds the mobile device 10, which has a display screen 16. The logical image 14a is much larger than the physical display screen 16. There may be several 'planes' of the logical image, such as 14b, 14c through 14d, as will be discussed in more detail later. The MVD renders the entire logical image to a virtual viewing plane, but actually only physically renders a small portion of that plane to display 16. As the user moves the device in the logical information plane, information objects pass into and out of view, with the device 10 acting like a lens into the larger logical image.

As the user moves the device around the virtual desktop, or logical image, motion sensors support navigation and software tracks the device's location in physical space. Control semantics are associated with a variety of arm and hand motions that allow the user to execute commands and act upon information with the handheld device acting as a mouse cursor and buttons, keyboard or other user input devices.

Figure 2:
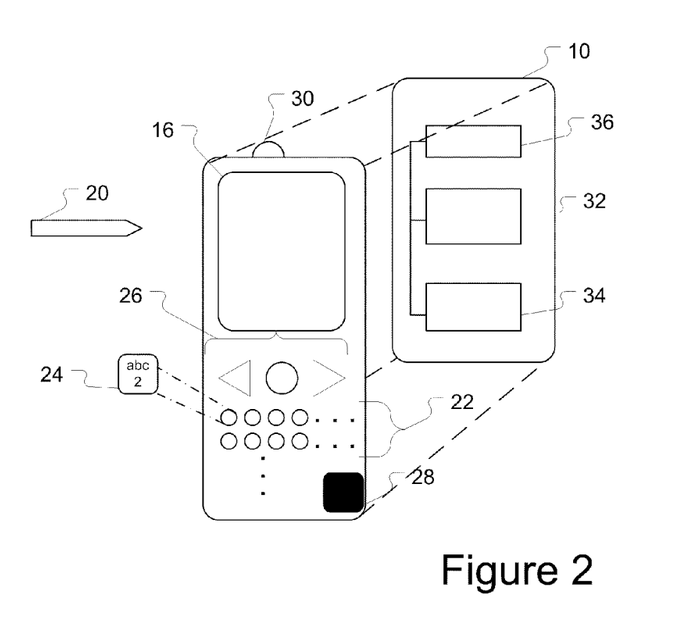
FIG. 2 shows an embodiment of a mobile device.

An example of a mobile device is shown in FIG. 2. The device 10 includes the display screen 16. The user input devices may include control buttons 26, or a keypad 22. The keypad 22 may further comprise a numerical keypad having keys similar to the exploded view 24, such as a cell phone, or a full styled keyboard. In addition, or in lieu of these input devices, the device may include a stylus 20 and the display screen 16 may be a touch-sensitive screen. Again, alternatively or lieu of these user input devices, the device may include a microphone 28, which may also serve as the mouthpiece of a cellular phone. These devices may not be necessary, as will be discussed in more detail later, the user may actually use the device itself as an input device. But MVD does not preclude their use in conjunction with MVD control mechanisms.

An internal view of the device 10 shows that it has a position determining circuit 32, such as an accelerometer or other motion sensor array. The position determining mechanism is self-contained within the device and does not rely upon any external mechanisms. It allows the system to compute its position relative to a dynamically set home coordinate. The position determining system also determines the direction and nature of the movement, a processor 34 and a memory 36. There is nothing in the position determining system that precludes it from working with, in a complementary manner, an external position determination system, such as, GPS or other radio tagging systems to gain additional functionality.

The processor may be operable to render a portion of the logical image on the screen. The portion of the logical image being rendered will depend on the device's position relative to the logical image. The device's position may also determine the 'active' application or object. The motion sensor array will also serve to notify the processor when the user performs a control gesture. The user may 'zero' or define a home coordinate for the device to allow the processor to translate the motions into a current device position.

The memory 36 may store a 'dictionary' or other list of control gestures and their meanings. This allows the user to move the device in a predetermined pattern or motion and have that motion translate into an executable command for the device, such as a mouse click or a button press in a conventional PC would. The processor would access the dictionary to determine what the actions are relative to a particular gesture. However, the processor may just compute distance and direction to determine what portion of the logical image is to be displayed.

Figure 3:
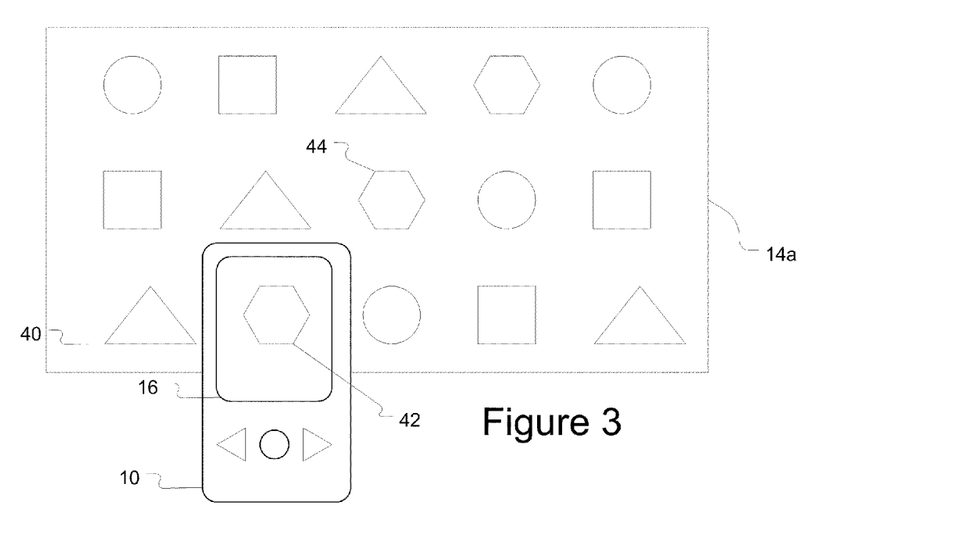
FIG. 3 shows an embodiment of a mobile virtual desktop.

The interaction between the mobile device and the logical device can be seen more clearly in the examples of FIG. 3. When the user 'turns on' the desktop, the user may need to 'zero' the device. This may be done spatially, where the device defaults to a display of the lower left corner of the logical image. The user then moves the device to a position that locates that corner of the image in a comfortable position and then presses a button to set that position as the home coordinates. Alternately, the user could pan around the logical image until a homing object is located and the selected by a command gesture or button press or other user input.

Once the device is homed or zeroed, the user then moves it around the logical image. One example of this is shown in FIG. 3. The device 10 is positioned in the logical image 14*a* such that object 42 are in view. The user cannot see the other objects in the plane. The objects 40 and 44 represent information objects, such as icons for applications, documents or other objects in the logical image, but not seen by the user.

Figure 4:
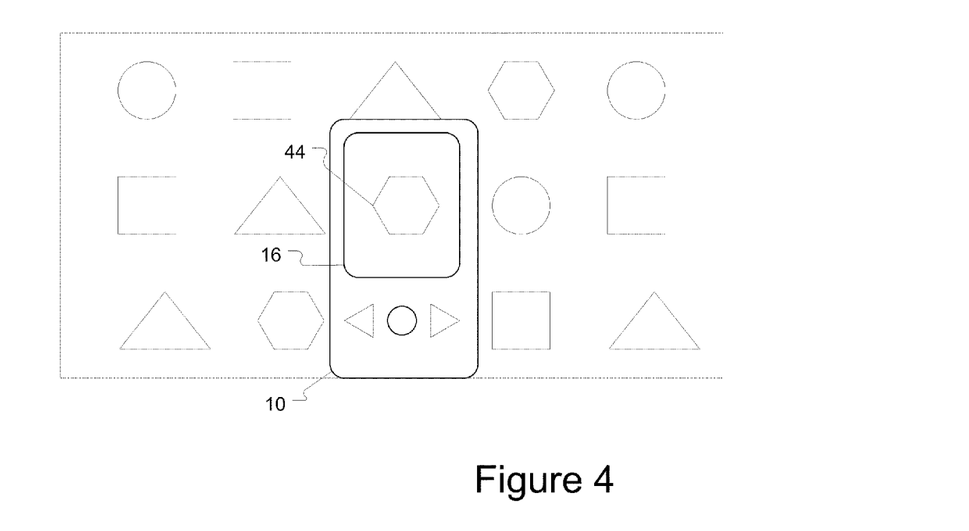
FIG. 4 shows an alternative view of a mobile virtual desktop.

In FIG. 4, the user has moved the device relative to the object displayed in FIG. 3, up and to the right. The logical image may be horizontal or vertical to the plane of the Earth. If the logical image were horizontal, the move would be out and to the right, rather than up and to the right. For purposes of the example, assume that the user wishes to select the object 44 shown in the display 16 of device 10 in FIG. 4.

Figure 5:
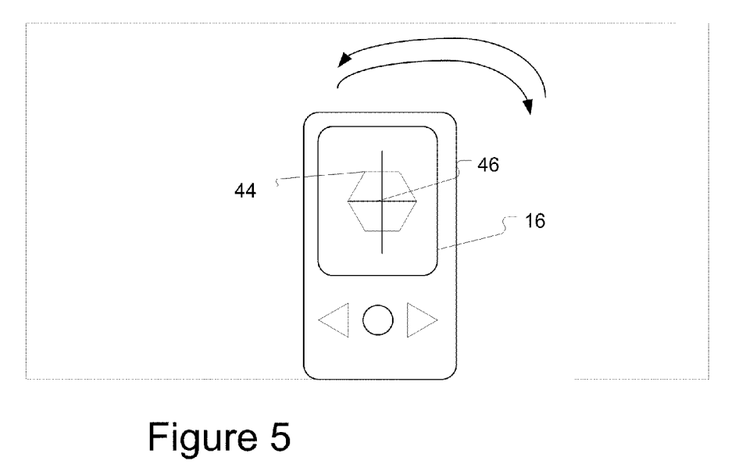
FIG. 5 shows an embodiment of a control gesture.

For ease of discussion, all of the objects in the image plane not selected are eliminated from the illustration of FIG. 5. Those objects are still in the logical image, but the user cannot see them. In order to select the object represented by object 44, the user may center crosshairs 46 over the object and then perform a command gesture. One example of a command gesture may be for the user to move the device sharply in the clockwise direction and then back to 'neutral' in the counter clockwise direction. This gesture would have been predefined to cause the device to open or execute the object in view, referred to here as the selected object. Alternatively, the user may perform a more conventional user input such as a button press or provide a speech input.

The gesture dictionary may be a configurable database of unique motion signatures associated with standard navigational operations, such as selecting an object, opening an object, scrolling, increasing or decreasing a slider, closing an application, saving a document, etc. A user could customize the MVD operating environment by creating or modifying a motion signature for a set of predetermined commands, or may be able to develop the user's own commands and motions, similar to defining macros in a word processing application.

Generally, gestures may have two components, spatial direction and timing. As the device moves in space, it will have an instantaneous direction and speed, and possibly acceleration, value. These measurements are obtained from the motion sensor array and processed to determine location in the desktop boundaries, as well as translated into commands for the application or object in view. The device could be 'trained' similar to handwriting or voice recognition to recognize certain basic gestures. In the example of FIG. 5, the gesture is translated to open the document.

Figure 6:
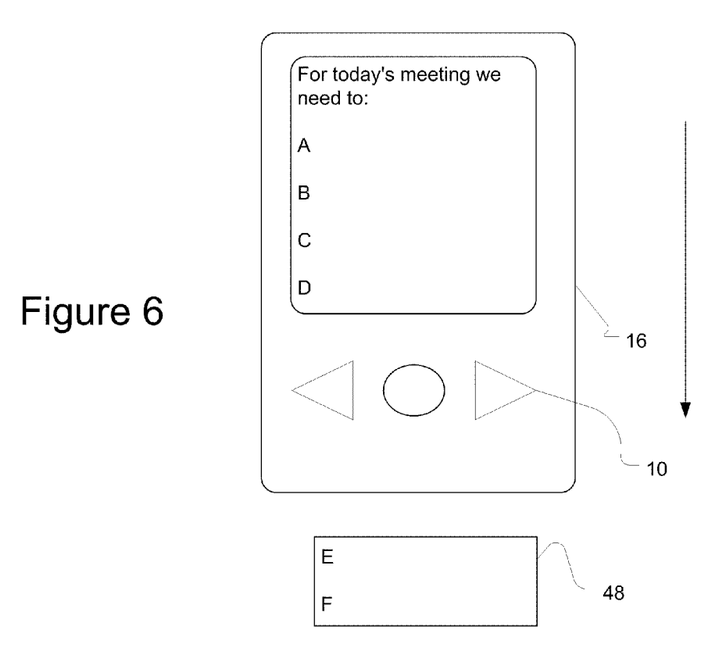
FIG. 6 shows an embodiment of an object on a mobile virtual desktop displayed upon a mobile device.

FIG. 6 shows the rendering of the object 44 on the display of the device. In this example, object 44 was an e-mail about a meeting. The first portion of the e-mail is displayed on the screen 16. If the user wants to view the remaining portions of the email, shown by box 48, the user moves the device down along the direction shown by the arrow. This operates the device as an input device, rather than relying upon a more conventional and possibly awkward input means such as a key or stylus input.

Up to this point, the discussion has been as if the device is operating in device relative mode. There are two modes, device relative and user relative. Within user relative mode, there are also two subcategories, user awareness mode and room awareness mode. Each of these will be addressed in turn. In device relative mode, the logical image is that as shown by logical image 14*a* of FIG. 1, a two-dimensional image of objects that are larger than can be displayed on the mobile device.

However, as can be seen in FIG. 1, the logical image may have several different planes, each one a predefined distance from the others. In the example of FIG. 1, the different image planes are assumed to be a different distance away from the user and the logical image is oriented vertically. If the logical image were oriented horizontally, the different image planes would be located at different distances from the Earth or a bottom plane, stacked in front of the user. The use of a three-dimensional logical image occurs in user relative mode.

With a three dimensional image, the Z-axis becomes a navigational part of the interaction, instead of just an interpretation of a control gesture. The movements along the Z-axis can be tracked in different ways, two examples are in user awareness mode and room awareness mode. In user awareness mode, the different planes of information are defined as being relative to the front of the user's body. The user will home or zero the device as the front plane of the logical image, for example. This may be 6-8 inches from the front of the user's body. As the user navigates the logical image, a movement along the Z-axis another 6-8 inches away from that plane may cause another plane to come into view. The user does not necessarily need to remember the exact depths set by the different image planes, as the user can scan around with the device until the object being displayed changes to one on the next plane of the image.

In a further adaptation of this approach, the device could operate in a 'room awareness' mode. Any physical room could be mapped out to contain certain task-specific zones, referred to here as hot zones or active zones. Because the MVD handheld has the capability to recognize when it is in a particular hot-zone, it can be configured to behave in a manner that is specific to the hot-zone. For example, this behavior might be pre-set into the handheld by software installed by a company's information technology administrator per the company's security or safety policy. The zones are areas of a room where work can be done with a specific number and type of applications. For example, a conference table may be defined as a 'meeting hot zone' where only that information on the logical image that is 'public' may be accessible by other users and their devices. A port 30, shown in FIG. 2, may facilitate sharing of information.

Figure 7:
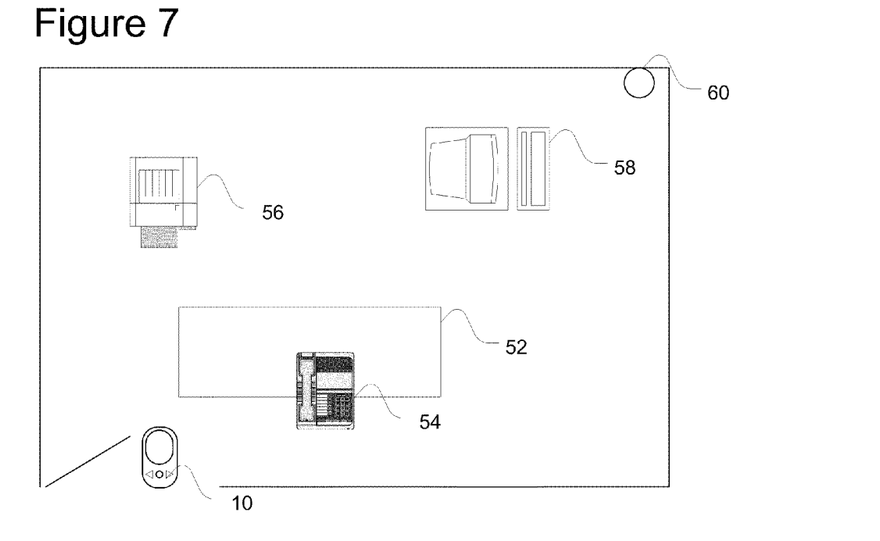
FIG. 7 shows an embodiment of a room with active zones for a mobile virtual desktop.

The hot zones may cause the device applications and objects to be bound, or it may activate certain applications. For example, assume a user enters the room shown in FIG. 7 with the device 10. In the room are a printer 56, a PC 58, and a conference table 52 with a teleconference phone 54 upon it. The room beacon 60 allows an MVD device to automatically home itself at the door. From then on, it would use its self-contained position determining mechanism to locate itself within the room.

The room itself has an effect upon which elements of the logical desktop get displayed in the MVD desktop such as the granted level of resource access and control. For example, consider a 'restricted' employee who is not granted access to company confidential information. When the restricted MVD user sits at the conference table at the center of the room, the user's MVD will have calculated within the room that the user is at the center of the room where the table is. While in this hot zone, no private company information will be accessible.

In order to facilitate this type of room awareness, the user may map different rooms and save them in several different profiles such as Conference Room 1, Auditorium 1, etc. The MVD device would be programmed with the coordinates of the room's hot zones. Whenever the user enters that room, the user would zero the MVD device's coordinates relative to the room coordinates of hot zones. This allows the device to alter the logical image presented depending upon the device location. This process may be further facilitated by the use of a beaconing device such as that shown as 60 in FIG. 7. This would allow the device to determine its position relative to the incoming signal, and thereby establish its home position.

The above discussion is intended merely as an example. The logical image could be constructed in whatever manner the system designer and the device capabilities allow. For example, the user could navigate an image similar to a representation of an actual desktop, almost as if an invisible holographic image of the user's actual desktop in the user's office were in existence.

Figure 8:
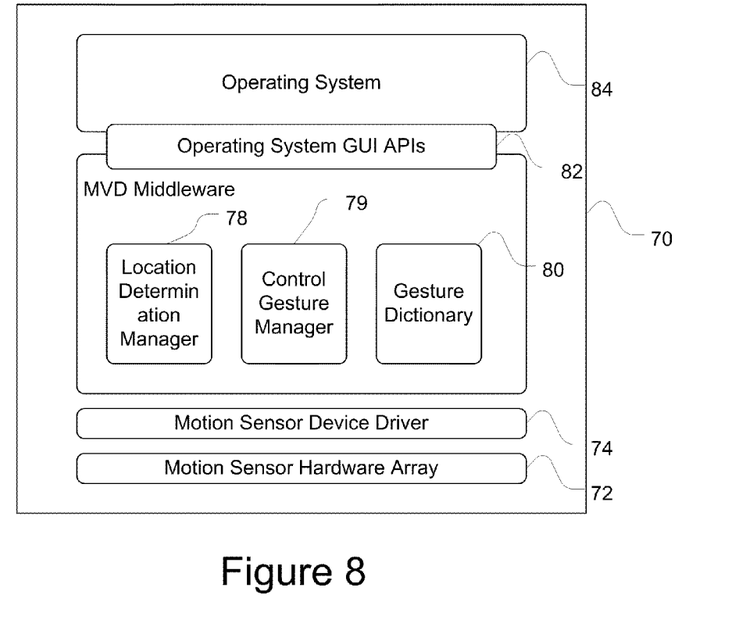
FIG. 8 shows an embodiment of a mobile virtual desktop software stack.

An aspect of the MVD that allows the functionalities and features discussed is a software stack that includes 'middleware.' The middleware is software that translates between the physical movement and position of the device and the various graphical user interface (GUI) application programming interfaces (APIs) of the various applications and objects being operated upon. An example of such a stack is shown in FIG. 8.

The operating system 84 of the device is supported by the operating system GUI APIs 82, which perform the function calls to the operating system 84. The middleware layer 76 generates the function calls. The middleware manages the gestures dictionary 80, and provides logic to associate gestures with the computing actions. The middleware also provides support to the user interface that allows the user to configure the gestures dictionary and to interact with the behaviors of the logical image.

The middleware manages the current state of the MVD desktop logical image and the processes. These include the location determination manager 79 and the gesture control manager 79. These translate the gestures and movements into state transitions and function calls for the operating system GUI APIs that allows the device to execute operating system commands. In addition, the middleware performs the interface tasks between the motion sensor hardware and the motion sensor drivers that allow the middleware to determine the position and motions of the device.

In some embodiments, the processes of the invention may be included in an article of machine-readable code that, when executed causes the machine to execute the various processes of the invention.

Figure 9:
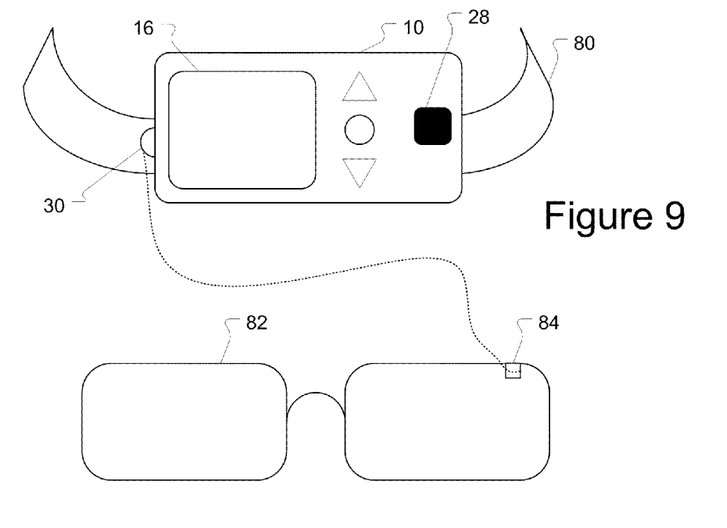
FIG. 9 shows an alternative embodiment of a mobile device.

The MVD applications and use is not limited to any particular configuration of the device, nor is it restricted to the personal digital assistant functionalities commonly used with mobile devices. In FIG. 9, for example, an alternative configuration is shown for the mobile device. The mobile device 10 is mounted on a watchband 80. The device may rely upon gestures only to provide user interaction with the applications and data, or may include some control buttons or other types of inputs, such as speech.

In this embodiment, the display 16 may function as a wristwatch display until the user activates the MVD, although no watch functionality is necessary. At that point, the display may optically switch to performing like a microdisplay. A microdisplay is a display that has been optically configured to project images directly to the user's eye and typically requires that the display be held very close to the eyes. While holding the watch and device up close to the eye may be uncomfortable, it would allow the user to take advantage of the functions of the mobile device and the capabilities of the MVD.

However, it is also possible that the use of gestures in such a constrained configuration makes the translation of the gestures imprecise. It is also possible that the display 16 may function just as a watch face and possibly as an initial screen. The mobile device 10 would then transmit the information to be displayed through the port 30 to a pair of wearable lenses, on a separate eyepiece such as eyeglasses, 82. The receiver 84 would then receive the display data and render it on one or both of the lenses of the eyepiece 82.

Figure 10:
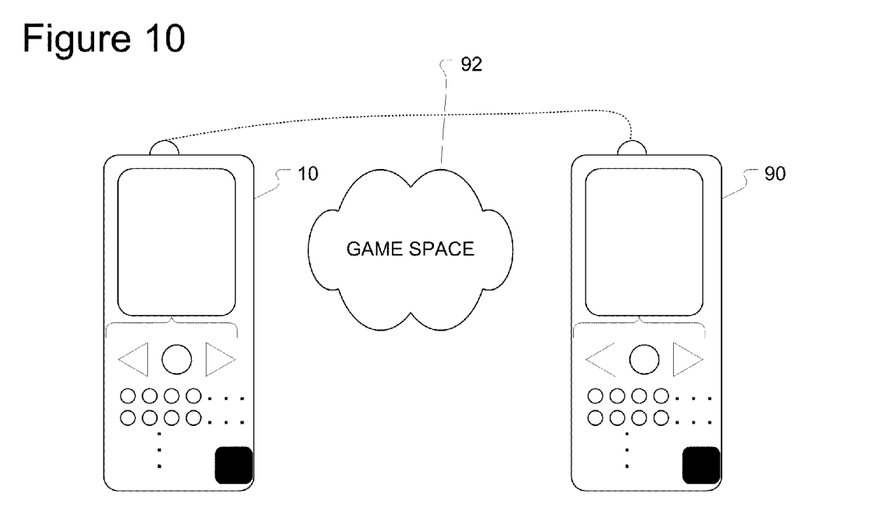
FIG. 10 shows an embodiment of a game space created by two mobile devices.

The MVD is also easily extensible beyond the PDA or cell phone applications. For example, a first user may launch a game application on a first mobile device 10, while a second user then launches a game application on a second mobile device 90. The two devices would also establish a mutual game space 92 in a peer-to-peer link. The game space may be established by zeroing and defining regions for each device and then communicated those coordinates to the other device. In this manner, the users may 'share' a MVD space that differs greatly from a shared desktop.

Thus, although there has been described to this point a particular embodiment for a method and apparatus for a mobile virtual desktop, it is not intended that such specific references be considered as limitations upon the scope of this invention except in-so-far as set forth in the following claims.

What is claimed is:

1. A method, comprising:
receiving information related to one or more sensed movements of a mobile device, each of the one or more sensed movements comprising movement along at least one of an X-axis, a Y-axis or a Z-axis;
interpreting at least one sensed movement on a plane defined by the X-axis and the Y-axis as a view navigation movement from a first portion of a first virtual display to a second portion of the first virtual display and at least one sensed movement along the Z-axis as a view navigation movement from the first virtual display to a second virtual display arranged on a different plane than the first virtual display, wherein the first virtual display and the second virtual display include separate navigable display areas larger than a display area of a display of the mobile device;
receiving information related to one or more zones;
altering at least one of the first virtual display or the second virtual display based on a proximity of the mobile device to the one or more zones; and
in response to the view navigation movement, causing a displayed portion of the first or second virtual display to move from a first displayed portion of the first or second virtual display to a second displayed portion of the altered first or second virtual display or from the first virtual display to the altered second virtual display.

2. The method of claim 1, wherein the X-axis and Y-axis extending in an approximate plane parallel to a front surface of the mobile device.

3. The method of claim 2, further comprising:
the Z-axis extending in an approximate perpendicular line above and below the approximate X-axis and Y-axis plane.

4. The method of claim 1, further comprising interpreting at least one of the one or more sensed movements as a gesture command.

5. The method of claim 4, wherein the gesture command comprises a command to activate the virtual display, wherein the virtual display becomes navigable when activated.

6. The method of claim 1, comprising causing the displayed portion to move relative to the acceleration amount.

7. A mobile device, comprising:
a display screen to display a first portion of a virtual display, the virtual display including a navigable display area larger than the first portion displayed on the display screen;
at least one motion sensor to detect movement of the mobile device along at least an X-axis, a Y-axis or a Z-axis, the motion sensor comprising an accelerometer; and
a virtual display navigation logic to:
receive information related to one or more movements of the mobile device sensed by the motion sensor;
interpret at least one sensed movement on a plane defined by the X-axis and the Y-axis as a view navigation movement from the first portion of the virtual display to a second portion of the virtual display and at least one sensed movement along the Z-axis as a view navigation movement from the virtual display to a second virtual display arranged on a different plane than the virtual display;
receiving information related to one or more zones;
altering the virtual display based on a proximity of the mobile device to the one or more zones; and
cause the display screen to display the second portion of the altered virtual display or cause the display screen to display the altered second virtual display as a result of the view navigation movement interpretation.

8. The mobile device of claim 7, wherein the X-axis and Y-axis extend in an approximate plane parallel to a surface of the display screen.

9. The mobile device of claim 8, the Z-axis extending in an approximate perpendicular line above and below the approximate X-axis and Y-axis plane.

10. The mobile device of claim 8, the Z-axis extending in an approximate perpendicular line above and below the approximate X-axis and Y-axis plane.

11. The mobile device of claim 7, wherein the display screen is a touch-sensitive screen.

12. The mobile device of claim 7, wherein the virtual display navigation logic to interpret at least one of the one or more sensed movements as a gesture command.

13. The mobile device of claim 12, wherein the gesture command comprises a command to activate the virtual display, wherein the virtual display becomes navigable when activated.

14. The mobile device of claim 7, the virtual display navigation logic to cause the displayed portion to move relative to the acceleration amount.

15. A non-transient computer readable medium to store instructions, which upon execution by a computer, cause the computer to perform a method comprising:
receiving information related to one or more sensed movements of a mobile device, each of the one or more sensed movements comprising movement along at least one of an X-axis, a Y-axis, or a Z-axis;
interpreting at least one sensed movement on a plane defined by the X-axis and the Y-axis as a view navigation movement from a first portion of a virtual display to a second portion of the virtual display and at least one sensed movement along the Z-axis as a view navigation movement from the virtual display to a second virtual display arranged on a different plane than the virtual display, wherein the first virtual display and the second virtual display include separate navigable display areas larger than a display area of a display of the mobile device;
receive information related to one or more zones;
alter the virtual display based on a proximity of the mobile device to the one or more zones; and
in response to the view navigation movement, causing a displayed portion of the virtual display to move from a first displayed portion of the virtual display to a second displayed portion of the altered virtual display.

16. The non-transient computer readable medium of claim 15, wherein the X-axis and Y-axis extending in an approximate plane parallel to a front surface of the mobile device.

17. The non-transient computer readable medium of claim 16, wherein the method further comprises:
the Z-axis extending in an approximate perpendicular line above and below the approximate X-axis and Y-axis plane.

18. The non-transient computer readable medium of claim 15, wherein the method further comprises:
interpreting at least one of the one or more sensed movements as a gesture command.

19. The non-transient computer readable medium of claim 18, wherein the gesture command comprises a command to activate the virtual display, wherein the virtual display becomes navigable when activated.

20. The non-transient computer readable medium of claim 15, wherein the method further comprises causing the displayed portion to move relative to the acceleration amount.

21. A virtual display determination device, comprising:
logic, at least a portion of which is in hardware, the logic to:
receive information related to one or more sensed movements of a mobile device, the mobile device discrete from the virtual display determination device, each of the one or more sensed movements comprising movement along at least one of an X-axis, a Y-axis or a Z-axis;
interpret at least one sensed movement on a plane defined by the X-axis and the Y-axis as a view navigation movement from a first portion of a virtual display to a second portion of the virtual display and at least one sensed movement along the Z-axis as a view navigation movement from the first virtual display to a second virtual display arranged on a different plane than the first virtual display, wherein the virtual display includes a navigable display area larger than a display area of a display of the mobile device;
receive information related to one or more zones;
alter at least one of the first virtual display or the second virtual display based on a proximity of the mobile device to the one or more zones; and
in response to the view navigation movement, causing a displayed portion of the first or second virtual display to move from a first displayed portion of the first or second virtual display to a second displayed portion of the altered first or second virtual display or from the first virtual display to the altered second virtual display.

22. The virtual display determination device of claim 21, wherein the X-axis and Y-axis extending in an approximate plane parallel to a front surface of the mobile device.

23. The virtual display determination device of claim 22, further comprising:
the Z-axis extending in an approximate perpendicular line above and below the approximate X-axis and Y-axis plane.

24. The virtual display determination device of claim 21, further comprising the logic to:
interpret at least one of the one or more sensed movements as a gesture command.

25. The virtual display determination device of claim 21, wherein the gesture command comprises a command to activate the virtual display, wherein the virtual display becomes navigable when activated.

26. The virtual display determination device of claim 21, further comprising the logic to cause the displayed portion to move relative to the acceleration amount.

* * * * *